United States Patent
Pulford et al.

(10) Patent No.: US 6,676,789 B1
(45) Date of Patent: Jan. 13, 2004

(54) TIRE BUILDING APPARATUS

(75) Inventors: Carl Trevor Ross Pulford, Cuyahoga Falls, OH (US); Martin Lamar Sentmanat, Akron, OH (US)

(73) Assignee: The Goodyear Tire and Rubber Company, Akron, OH (US)

( * ) Notice: Subject to any disclaimer, the term of this patent is extended or adjusted under 35 U.S.C. 154(b) by 0 days.

(21) Appl. No.: 09/979,747

(22) PCT Filed: May 20, 1999

(86) PCT No.: PCT/US99/11254

§ 371 (c)(1), (2), (4) Date: Nov. 16, 2001

(87) PCT Pub. No.: WO00/71327

PCT Pub. Date: Nov. 30, 2000

(51) Int. Cl.⁷ .............................................. B29D 30/28
(52) U.S. Cl. .................... 156/130.3; 156/286; 156/408; 156/413; 156/421
(58) Field of Search ..................... 156/130.3, 408–413, 156/421, 286, 444; 38/14; 15/405

(56) References Cited

U.S. PATENT DOCUMENTS

| | | | |
|---|---|---|---|
| 1,218,155 A | 3/1917 | Zimmerman | |
| 1,983,684 A | 12/1934 | Strong | |
| 2,258,659 A * | 10/1941 | Mosler, Jr. ................... | 15/405 |
| 2,605,195 A * | 7/1952 | Boughton | |
| 3,543,718 A | 12/1970 | Keeler | |
| 3,832,972 A | 9/1974 | Pace | |
| 3,997,385 A * | 12/1976 | Osborne | |
| 4,069,080 A * | 1/1978 | Osborne | |
| 4,134,362 A | 1/1979 | Rush | |
| 4,369,584 A * | 1/1983 | Daane ......................... | 34/392 |
| 4,515,103 A | 5/1985 | Greig | |
| 4,515,200 A | 5/1985 | Williams | |
| 4,517,916 A | 5/1985 | Barch et al. | |
| 4,638,756 A | 1/1987 | Collmann | |
| 4,665,860 A | 5/1987 | Steffel | |
| 4,958,587 A | 9/1990 | Fogal, Sr. et al. | |
| 5,065,694 A | 11/1991 | Earnheart | |
| 5,256,445 A | 10/1993 | Nojiri et al. | |
| 5,573,625 A | 11/1996 | Lovell et al. | |

FOREIGN PATENT DOCUMENTS

| | | |
|---|---|---|
| EP | 0845374 A2 | 6/1998 |
| EP | 0845374 A3 | 12/1998 |
| GB | 1 592 003 | 7/1981 |
| JP | 59-91026 A * | 5/1984 |
| JP | 5-169565 A * | 7/1993 |

* cited by examiner

Primary Examiner—Geoffrey L. Knable
(74) Attorney, Agent, or Firm—Brouse McDowell; Roger D. Emerson

(57) ABSTRACT

A tire apparatus (14) having nozzles (32) for directing air steams against layers (34) of uncured tire components applied to a tire building drum (19) for stitching and ejecting air from the layers.

13 Claims, 4 Drawing Sheets

TIRE BUILDING APPARATUS

TECHNICAL FIELD

This invention relates to a stitching apparatus for assembling uncured tire components such as plies on a tire building drum. Streams of air under pressure from nozzles positioned around the tire building drum stitch and eject air from under the tire components as the drum is rotated.

DISCLOSURE OF INVENTION

Stitching apparatus utilizing metal stitcher disks, such as those shown in U.S. Pat. No. 3,125,481 have been used to stitch tire tire components applied to a tire building drum. Improved apparatus to control the pressure applied by a stitcher disk is shown and described in U.S. Pat. No. 3,524,784. With these stitcher disks, the drum must be rotated a sufficient number of revolutions for the disks to traverse the distance between a position midway between the edges of the drum and the edges of the drum to press the tire components sufficiently to eject air and stitch the components together. Sufficient pressure must be applied to do the stitching, and at the same time, safeguards must be provided so that the green tire materials of the tire components are not distorted during this pressing action. Also, the moving parts on which the stitcher disks are mounted must be designed so that they can be adjusted for different size tires. Set up time is required which reduces time available for production time. The environment for the stitching rollers is not favorable and maintenance problems, such as failure of the roller bearings for the stitching rollers, are inherent with this type of stitching.

SUMMARY OF THE INVENTION

The present invention is directed to an improved stitching apparatus for stitching and ejecting air from layers of tire components applied to the cylindrical surface of a tire building drum. This is done with substantially no moving parts requiring a minimum of maintenance. Also, the stitching is done without contacting the tire components, resulting in substantially no distortion of the components during the stitching operation. The cycle time is reduced because the squeezing action is provided with a minimum of revolutions of the drum. Substantially no set up time for different size tires is required, hence the same set up can be used for stitching different width tire components.

In accordance with one aspect of the invention, there is provided a stitching apparatus for use with a tire building drum which is rotated for wrapping successive layers of tire components around a cylindrical surface of the drum comprising a supporting structure, a manifold mounted on the structure adjacent the drum in communication with a source of air pressure, characterized by nozzles in communication with the manifold positioned for directing streams of air through the nozzles under pressure against the layers of tire components on the surface, and means to rotate the tire building drum to expose successive portions of the layers to the streams of air as the tire components are carried past the nozzles on the rotating drum so as to stitch and eject air from the tire components.

In accordance with another aspect of the invention, there is provided a method of building a tire on a rotatable tire building drum comprising wrapping successive layers of tire component around the drum characterized by directing streams of air under pressure against the layers of tire components to press the layers together and eject air from between the layers as the drum is rotated.

DETAILED DESCRIPTION OF THE INVENTION

Figure 1:
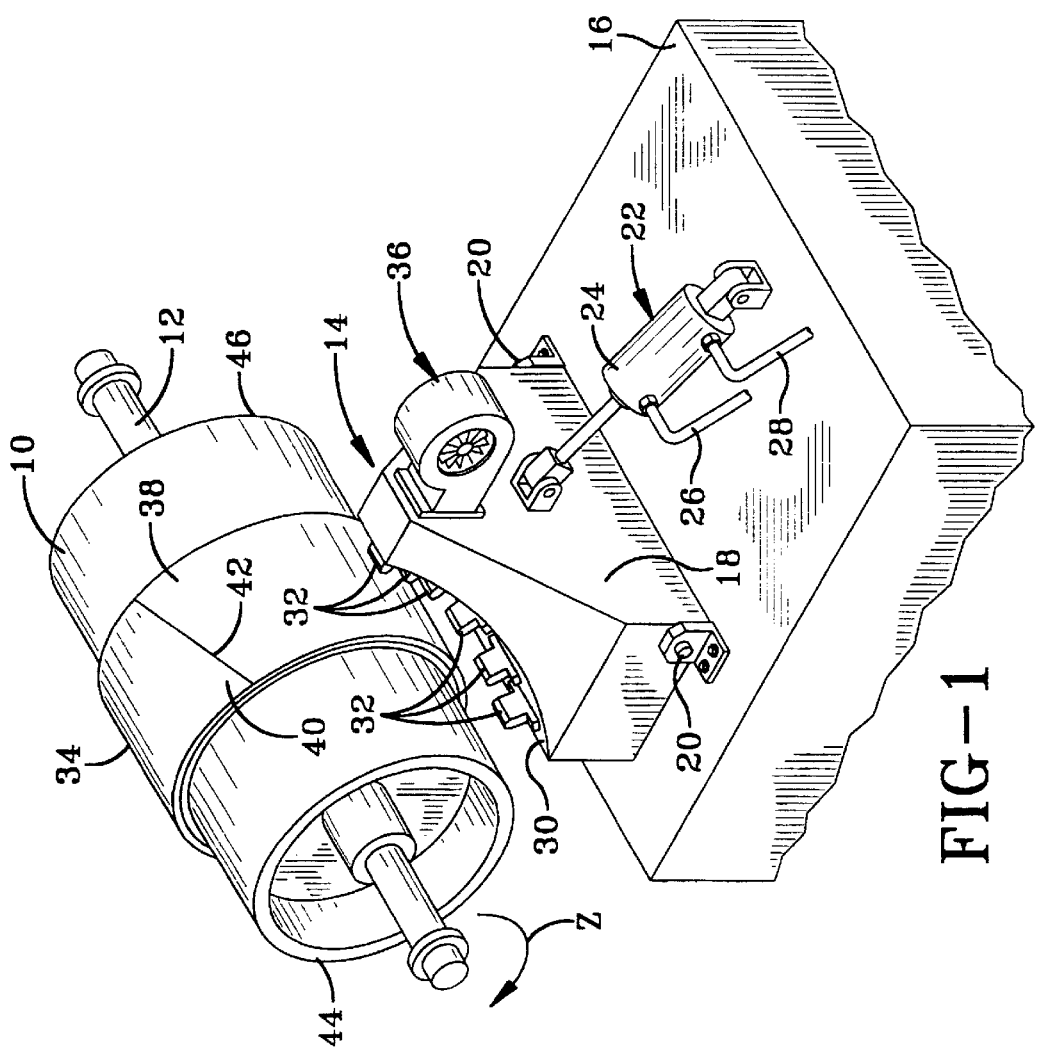
FIG. 1 is a view in perspective of a tire building drum having a tire component stitching manifold and air jets embodying the invention with parts being broken away.
Figure 2:
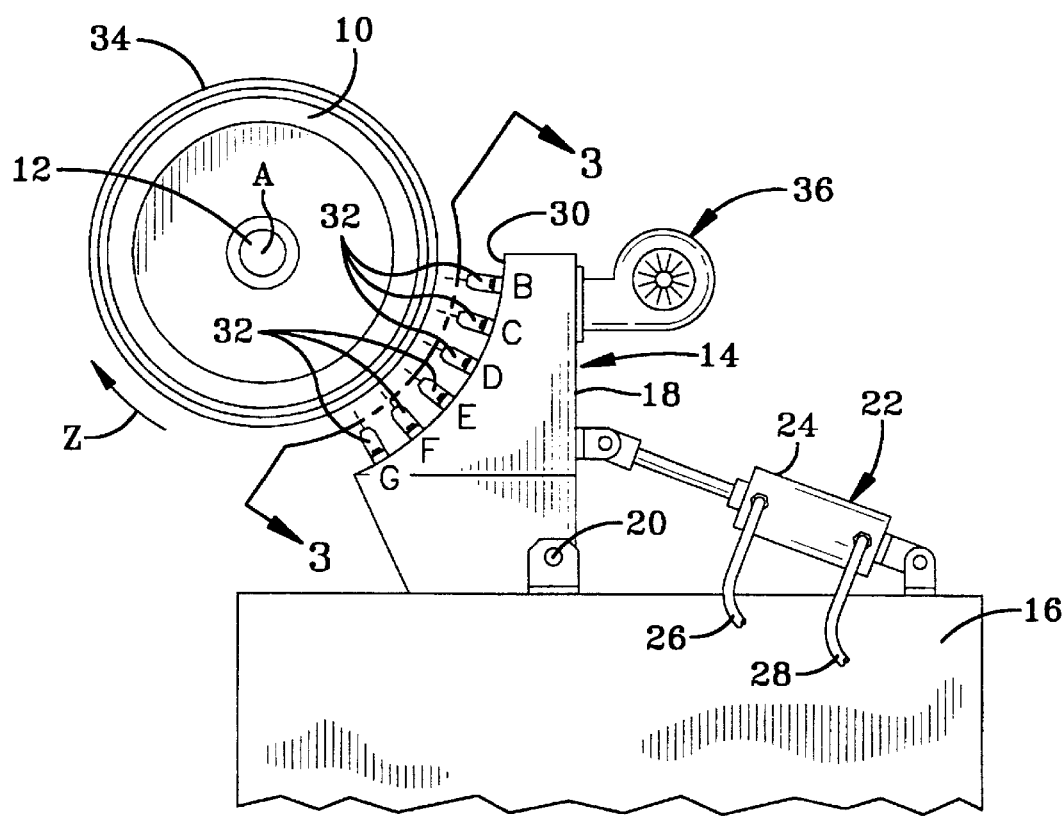
FIG. 2 is a side elevation of the apparatus shown in FIG. 1.
Figure 4:
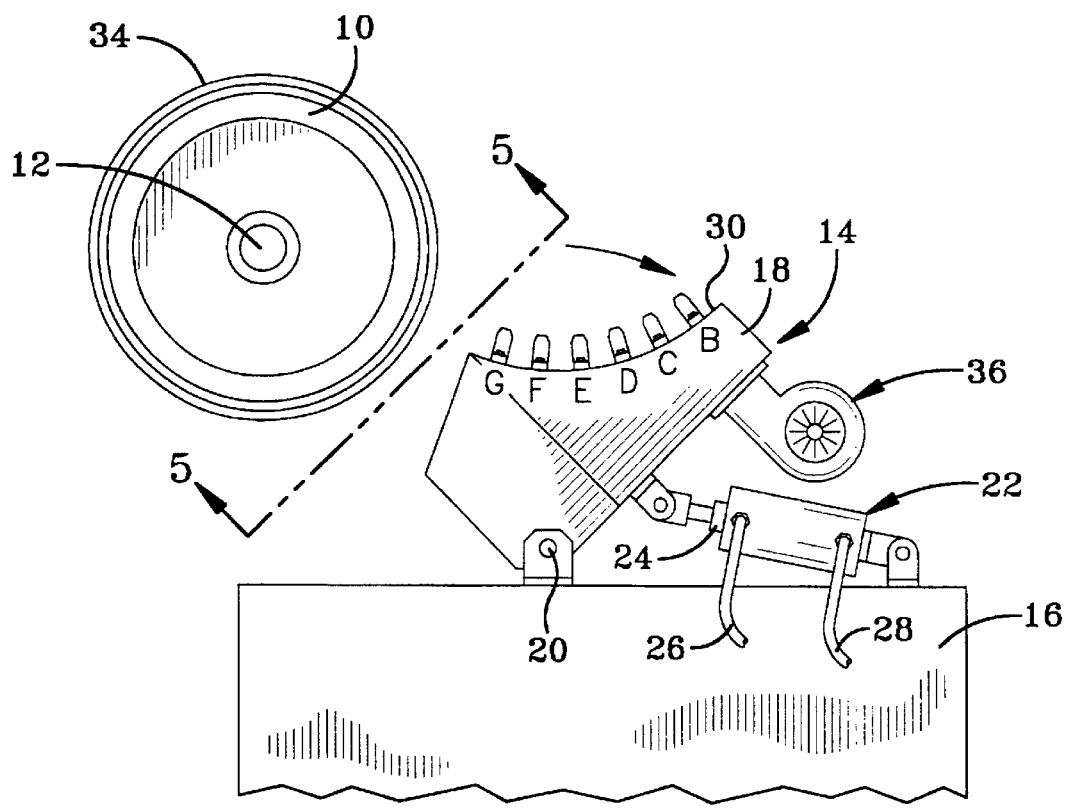
FIG. 4 is a view like FIG. 2, showing the manifold in a retracted position.

Referring to FIGS. 1 and 2, a tire building drum 10 is shown which may be of a collapsible type mounted for rotation about a shaft 12. A ply stitching apparatus 14 is positioned adjacent the drum 10 and has a supporting structure such as a beam 16 of steel or other rigid material for mounting on the floor of a tire plant. A manifold 18, which may be a fabricated steel container, is mounted on hinges 20 fastened to the beam 16 to permit rotation from the position shown in FIGS. 1 and 2 to the retracted position shown in FIG. 4. A piston-cylinder assembly 22 is hingedly fastened to the beam 16 and manifold 18 for rocking the manifold 18 about the hinges 20. A piston 24 of the assembly 22 may be double-acting and connected to controls for actuating the piston by hoses 26 and 28.

Figure 3:
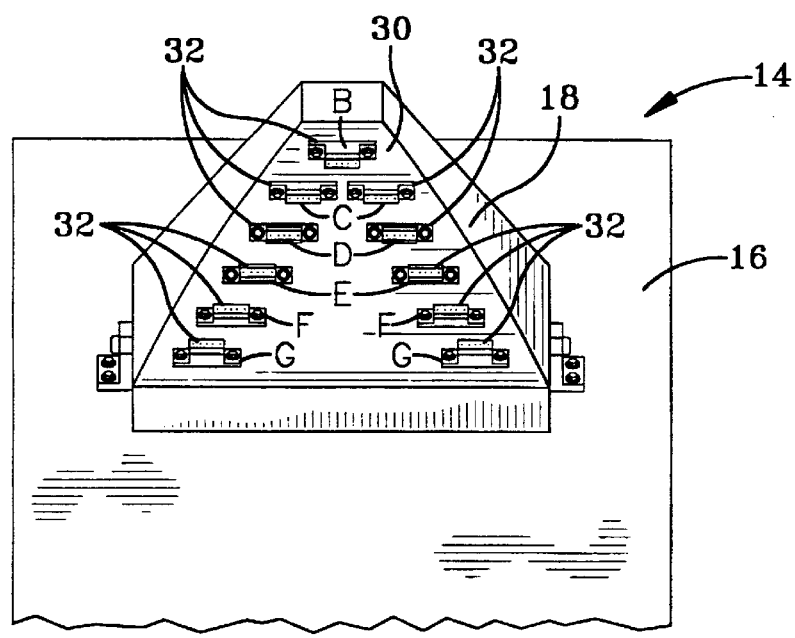
FIG. 3 is a sectional view taken along the line 3—3 in FIG. 2, showing the positions of the jets on the manifold.

The manifold 18 has a drum face 30 for positioning adjacent the drum 10 in the operating position of the apparatus 14 shown in FIGS. 1, 2 and 3. Nozzles 32 are mounted on the drum face in communication with an air chamber (not shown) within the manifold 18. Preferably the nozzles 32 have passages extending in a radial direction A–B, A–C, A–D, A–E, A–F, A–G, providing radial streams of air for pressing layers of tire components 34 against the surface of the tire building drum 10. In the position of the manifold 18, shown in FIGS. 1, 2 and 3, air under pressure may be communicated to the manifold 18 from a source of air pressure, such as a blower 36 mounted on the manifold.

Figure 5:
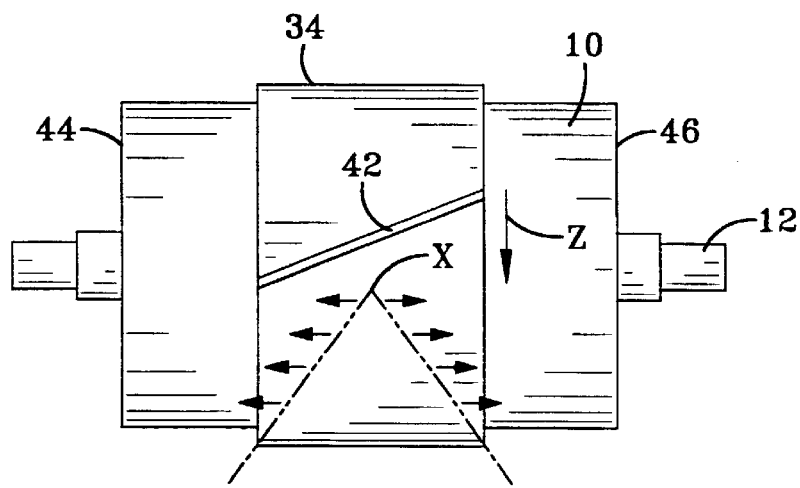
FIG. 5 is a view of the drum taken along line 5—5 in FIG. 4 showing the V-shaped configuration of the nozzles over the layer of tire components in dot dot dash lines.

The nozzles 32 are preferably in an overlapping relation and are positioned in a V-shaped configuration shown in FIG. 3 for impinging air under pressure on the layers 34 of tire components at positions shown in dot dot dash lines in FIG. 5.

In operation the layers of tire components 34 are laid on the drum 10 by rotating the drum while a server applies the tire components, which may be of a length equal to the circumference of the drum with biased ends 38 and 40 being spliced at splice 42. This operation is performed with the manifold 18 in the retracted position shown in FIG. 4 where the double-acting cylinder 24 is actuated to pull the manifold away from the drum 10. After the layers of tire components 34 are applied to the drum 10, the manifold 18 may be rotated into the operating position shown in FIGS. 1, 2 and 3 with the nozzles 32 facing the layers of tire components 34. The drum 10 is then rotated in a clockwise direction as shown in FIGS. 1, 2 and 5, and air under pressure is supplied to the manifold 18 so that streams of air in the direction of the passages A–B, A–C, A–D, A–E, A–F and A–G impinge upon the layers of tire components 34. It can be seen from FIG. 2 and FIG. 5 that as the drum 10 rotates in the direction of the arrow Z, a first jet 32 at the position X shown in FIG. 5, at the apex of the V-shaped configuration will project a stream of air against the layers of tire components 34 at a position midway between the edges 44 and 46 of the drum 10 and in a direction AB as shown in FIG. 2. Then as the drum rotates, streams from the other jets will impinge upon the layers 34 in directions AC, AD, AE, AF and AG at positions spaced further from the position X midway between the edges to eject air from between the layers of tire components 34 at the edges. The resulting curtain of air under pressure provides stitching and ejection of air without contacting the layers of tire components 34. The stitching and ejection of air is applied to the full width of the layers of tire components 34 upon each revolution of the drum 10 and, therefore, the number of revolutions required for complete stitching does not depend upon movable rollers which require many revolutions to cover the width of the layers.

Figure 6:
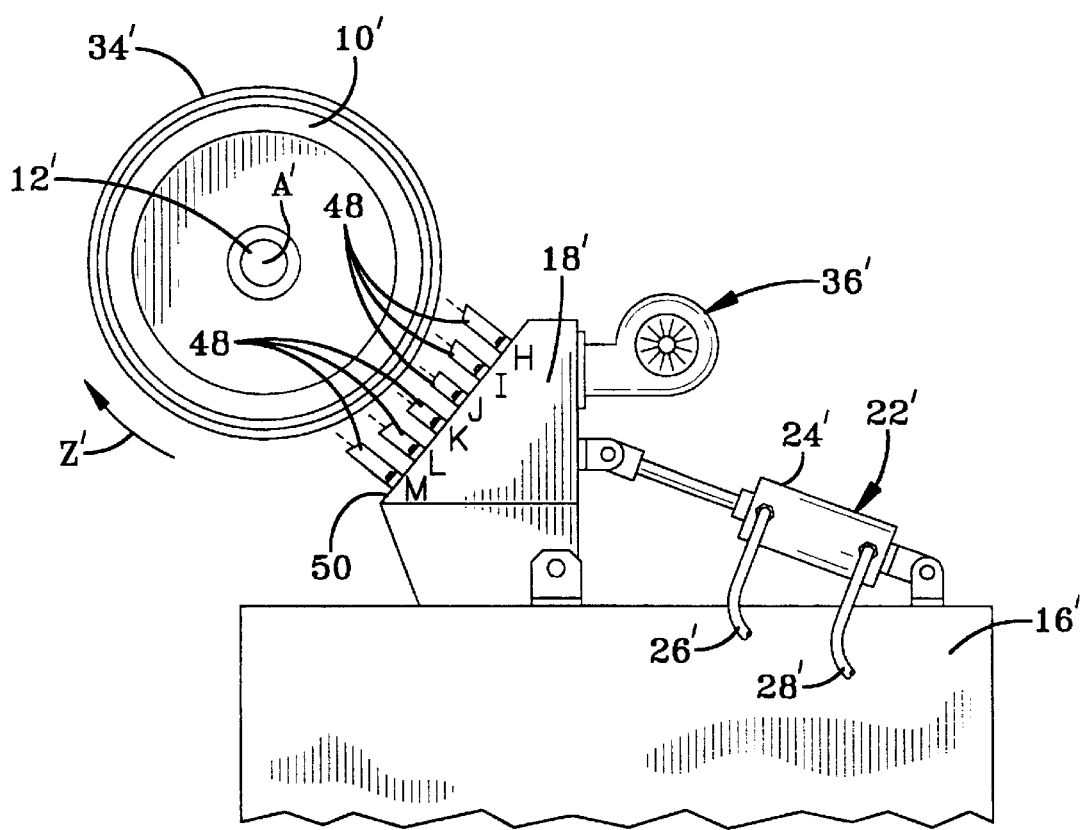
FIG. 6 is a view like FIG. 2 of a modification in which the nozzles are positioned to provide parallel streams of air impinging upon the layers of tire components.

As shown in FIG. 1, the nozzles 32 are mounted to provide streams of air under pressure in a radial direction through passages A–B, A–C, A–D, A–E, A–F and A–G. However, in the modification shown in FIG. 6, where similar parts have been designated by the same numerals, but with the addition of the prime mark, the manifold 18' has nozzles 48, which are mounted on a drum face 50, wherein the direction of the nozzle passages, A'H, A'I, A'J, A'K, A'L and A'M are in a parallel configuration with the ends of the nozzles being evenly spaced from the surface of the drum 10'. The nozzles 48 otherwise are positioned in a V-shaped configuration like that shown in the embodiment of FIGS. 1–5. The ends of the nozzles 48,48 are evenly spaced from the drum surface as are the nozzles 32,32 of the embodiment of FIGS. 1–5.

The invention has been described with reference to preferred embodiments. Obviously, modifications and alterations will occur to others upon a reading and understanding of this specification. It is intended to include all such modifications and alterations insofar as they come within the scope of the appended claims or equivalents thereof.

Having thus described the invention it is now claimed:

1. A stitching apparatus for use in assembling uncured tire components with a tire building drum which is rotated for wrapping successive layers of tire components around a cylindrical surface of said drum comprising a supporting structure, a manifold mounted on said structure adjacent said drum in communication with a source of air pressure, characterized by nozzles in communication with said manifold positioned for directing streams of air through said nozzles under pressure against said layers of tire components on said surface, and means to rotate said tire building drum to expose successive portions of said layers to said streams of air as said layers of tire components are carried past said nozzles on said rotating drums to stitch and eject air from said tire components.

2. A stitching apparatus according to claim 1 further characterized by said nozzles being disposed at spaced apart positions axially of said drum providing said streams of air under pressure from one edge of said layers of tire components to an opposite edge.

3. A stitching apparatus according to claim 2 further characterized by said nozzles being positioned in a V-shaped configuration with a central one of said nozzles at an apex of said V-shaped configuration for applying air under pressure to said layers of tire components at a position midway between edges of said drum surface prior to the application of air by other of said nozzles spaced toward said edges of said drum surface to stitch said layers of tire components and eject trapped air from between said layers.

4. A stitching apparatus according to claim 3, further characterized by said nozzles having elongated jet openings in overlapping relation to provide a continuous curtain of air against said layers of tire components.

5. A stitching apparatus according to claim 3 further characterized by said nozzles being mounted on said manifold with each of said nozzles having a jet opening having an axis extending radially of said tire building drum to provide a stream of air flowing in a direction perpendicular to the surface of said layers of tire components.

6. A stitching apparatus according to claim 1 further characterized by said manifold being adjustable radially relative to said drum on said support structure providing access to said drum surface for applying said tire components and removing said tire components after assembly.

7. A stitching apparatus according to claim 6 further characterized by a piston-cylinder assembly connecting said supporting structure and said manifold for adjusting said distance between said nozzles and said drum surface.

8. A stitching apparatus according to claim 6 further characterized by said manifold being hinged to said supporting structure for rotation from an operating position for directing streams of air pressure against said layers of tire components to a retracted non-operating position spaced from said tire building drum providing space for applying additional tire components and removing the assembled tire components from said drum.

9. A stitching apparatus comprising a stitching member mounted adjacent a tire building drum, the stitching member having a plurality of air guiding openings in close proximity to a tire component supporting surface of said drum, said openings being in communication with a source of air pressure providing streams of air under pressure directed at said tire component supporting surface for pressing tire components together during rotation of said drum.

10. A stitching apparatus according to claim 9 further characterized by said air guiding openings comprising nozzles mounted on said stitching member.

11. A method of building a tire on a rotatable tire building drum comprising wrapping successive layers of tire components around said drum characterized by directing streams of air under pressure against said layers to press said layers together and eject air from between said layers as said drum is rotated.

12. The method of claim 11 further characterized by directing said streams of air against said layers at a position midway between edges of said drum and then toward positions spaced further from said position midway between said edges and toward said edges of said drum as said drum is rotated to eject air from between said layers of tire components at said edges.

13. The method of claim 12 further characterized by said streams of air being directed by nozzles positioned on a supporting member in a V-shaped configuration for directing said streams of air from said nozzle at said position midway between said edges at an apex of said V-shaped configuration and then from nozzles at said sides of said V-shaped configuration as said drum is rotated.

* * * * *